United States Patent

Cassel

[15] 3,660,639

[45] May 2, 1972

[54] HIGH-SPEED CARD READER

[72] Inventor: John W. Cassel, Hatboro, Pa.

[73] Assignee: The National Cash Register Company, Dayton, Ohio

[22] Filed: Feb. 2, 1970

[21] Appl. No.: 7,649

[52] U.S. Cl. ........................................235/61.11 J, 200/46

[51] Int. Cl. ....................................G06k 7/02, H01h 35/24

[58] Field of Search ...............235/61.11 R, 61.11 A–61.11 J, 235/201; 250/219 D, 219 DC, 227; 200/46; 84/147, 151

[56] References Cited

UNITED STATES PATENTS

| | | | |
|---|---|---|---|
| 526,129 | 9/1894 | Hollerith | 235/61.11 J |
| 2,413,875 | 1/1947 | Lang | 235/61.1 |
| 3,485,970 | 12/1969 | Schonfeld et al | 235/61.11 J |
| 3,549,866 | 12/1970 | McWade | 235/61.11 A |
| 2,027,033 | 1/1936 | Ford | 235/61.11 J |
| 2,603,151 | 7/1952 | Bryce et al. | 235/61.11 E |

OTHER PUBLICATIONS

Sokolski, " Improved Fiber Optic Read Head," IBM Technical Disclosure Bulletin, Vol. 8, No. 11, 4/1966

*Primary Examiner*—Maynard R. Wilbur
*Assistant Examiner*—Thomas J. Sloyan
*Attorney*—Louis A. Kline, Albert L. Sessler and Elmer Wargo

[57] ABSTRACT

A high-speed card reader including a card feed hopper with a reading station being located directly beneath the hopper and aligned therewith. Because the reading station is aligned with the hopper, the lowermost card in a stack of cards in the hopper can be read while positioned at the bottom of the stack. After being read, the lowermost card is removed by a picker blade, and the next card is read while positioned at the bottom of the stack. All the holes in the card are read simultaneously at the reading station, which is air-operated.

1 Claims, 5 Drawing Figures

PATENTED MAY 2 1972

3,660,639

INVENTOR
JOHN W. CASSEL

Louis A. Kline

BY Albert L. Seisler, Jr.
Elmer J. Wargo
HIS ATTORNEYS

INVENTOR
JOHN W. CASSEL

BY Louis A. Kline
Albert L. Sessler, Jr.
Elmer L. Vargo
HIS ATTORNEYS

HIGH-SPEED CARD READER

BACKGROUND OF THE INVENTION

This invention relates to a high-speed reader for reading cards with punched holes.

The prior-art card readers generally include card input and output hoppers; a reading station; and transport means for moving a card to be read from the input hopper to the reading station, where the data in the card is read. The reading stations are constructed to read the data in the card serially or to read all the data simultaneously. After the card is read, it is transported to the output hopper by the transport means.

In each of the prior-art readers with which applicant is familiar, the card being read must be transported from an input hopper to a reading station, whereas in applicant's reader the cards are read while positioned in the input hopper. Because the cards are aligned as stacked in the input hopper, the lowermost card in the hopper is always in a position to be read by the reading station positioned under the hopper. As soon as the lowermost card is read, it can be moved away by a conventional card removal means to an output hopper. Eliminating the transport problems involved in a moving card to be read from the input hopper to a reading station increases the operating speed of applicant's card reader.

SUMMARY OF THE INVENTION

This invention relates to a high-speed reader for reading cards with punched holes therein. The reader includes an input hopper for storing cards to be read, a reading means, and transport means. The reading means is located directly below the input hopper and is aligned with the lowermost card in the hopper, so that the card can be read while still aligned by the hopper. As soon as the lowermost card is read, the transport means moves the card just read out of the hopper, leaving the next-lowermost card in position to be read. The reading means is adapted to read the data in the card from one side of the card. This is necessitated due to the lowermost card's being read while it is still a part of the deck of cards in the input hopper.

DETAILED DESCRIPTION OF THE EMBODIMENTS

Figure 1:
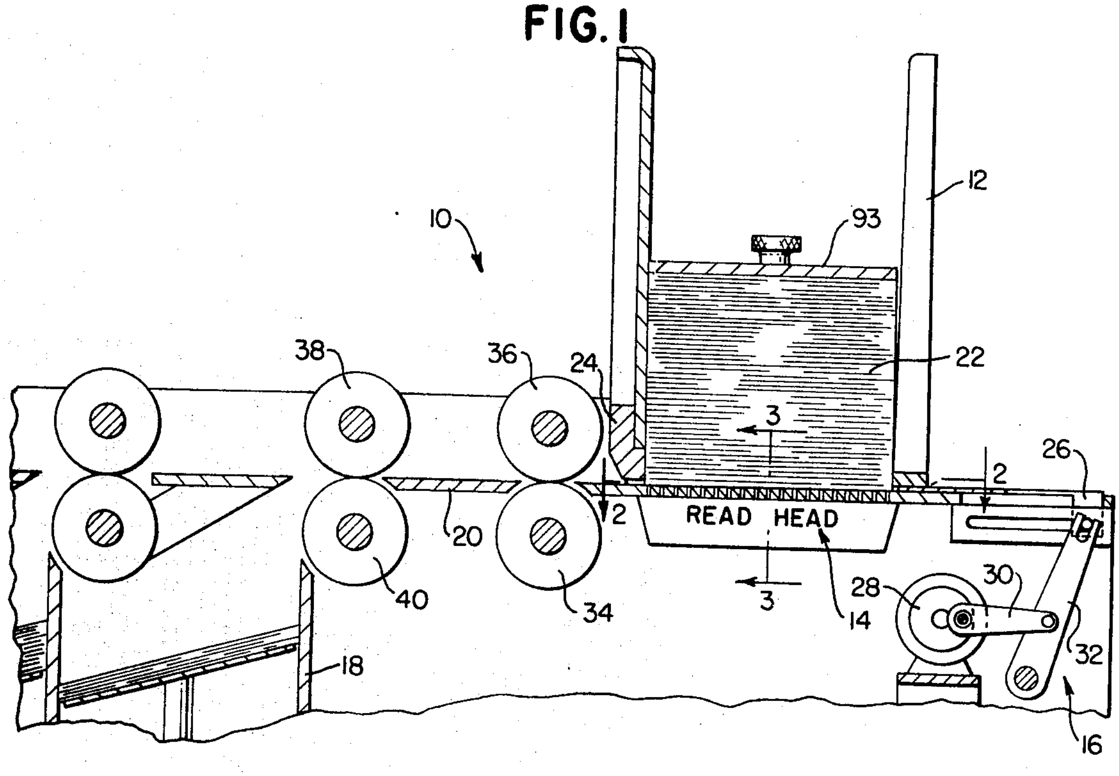
FIG. 1 is a general elevational view, partly in cross-section, of the card reader of this invention showing the location of a reading station below the input hopper of the reader.

FIG. 1 is a general elevational view, partly in cross-section, showing the general arrangement of the various elements included in the card reader of this invention. The card reader is designated generally as 10 and includes an input hopper 12, a reading means 14, a card transport means 16, an output hopper 18, and a table 20.

The input hopper 12 may be a conventional hopper having an open end which is positioned above the table 20 (FIG. 1), so as to enable the lowermost card in a stack 22 of cards to be removed from the stack by the card transport means 16. The hopper 12 has the usual adjustable throat knife 24, which permits only one card at a time to be removed from the hopper. As seen in FIG. 1, the reading means 14 is positioned directly beneath the hopper 12, so that the reading means is axially aligned with the lowermost card in the stack 22 of cards. By this arrangement, each of the cards of the stack 22 is aligned for being read by the reading means 14 as soon as it is placed in the hopper 12. As soon as the lowermost card in the hopper 12 is read by the reading means 14 (to be later described), it is moved out of the input hopper 12 to the output hopper 18 by the transport means 16.

The transport means 16 (FIG. 1) may be conventional and may operate as follows. The transport means 16 includes a picker blade 26, which is mounted for reciprocating movement parallel to the table 20 and is conventionally driven by a crank 28 and by levers 30 and 32. The picker blade 26 moves the lowermost card in the stack 22 far enough to the left (as viewed in FIG. 1) to enable it to be caught between the discharge rollers 34 and 36. From these rollers, the card is advanced farther to the left by rollers 38 and 40 and is diverted into the output hopper 18 or additional hoppers or pockets, as is conventionally done. As soon as the transport means 16 removes the lowermost card in the stack 22, the next card in the stack is in a position to be read by the reading means 14.

Figure 3:
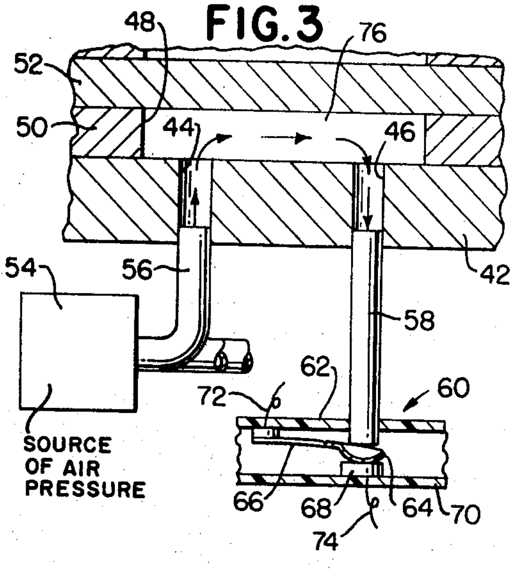
FIG. 3 is an enlarged cross-sectional view taken along the line 3—3 of FIG. 1 showing how a "hole" in a punched card is read by the air-operated reading station.
Figure 4:
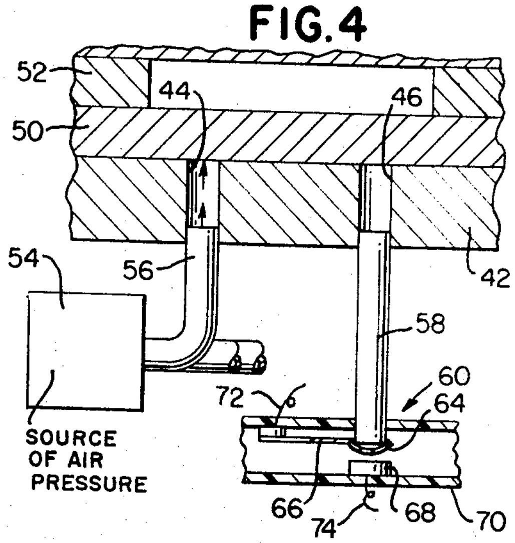
FIG. 4 is a cross-sectional view similar to FIG. 3 showing how a "no hole" situation in a punched card is read by the air-operated reading station.

One embodiment of the reading means 14 is shown in FIGS. 1, 3, and 4, and it uses air as the operating energy medium. The reading means 14 is of the matrix type, which, as here defined, means that all of the hole positions in a punched card may be read at one time if desired. Because the lowermost card in the stack 22 of cards is read while it is part of the stack, special reading means had to be developed which would enable it to be read while so positioned.

The reading means 14 (FIGS. 2, 3, and 4) includes a plate 42 having therein an entrance port 44 and an exit port 46 for each hole or data position in a punched card. These ports 44 and 46 are positioned relative to each other and the plate 42 so as to enable both ports to be located in the area of a hole 48 (FIG. 3) of a punched card 50. As shown in FIG. 3, the card 50 is the lowermost card in a deck of cards including the card 52, which is directly above the card 50. Each of the entrance ports 44 for each hole position in a card used with the reader is connected to a source 54 of air pressure by a conduit 56. Each of the exit ports 46 has a conduit 58 connected thereto, as shown in FIG. 3. The conduit 58 leads to a switch 60, one such switch being provided for each hole position to be read.

Each switch 60 (FIG. 3) of the reading means 14 is constructed in the following manner. The switch 60 has a plate 62 having therein a port to receive the conduit 58. The conduit 58 is directed at a dish-shaped end 64 of a spring-type, cantilever switch arm 66, whose remaining end is secured to the plate 62, which is made of electrically insulating material. The switch 60 also includes an electrical contact 68, which is mounted on an insulating plate 70. The arm 66 has a conductor 72 connected thereto, and, similarly, the contact 68 has a conductor 74 connected thereto, for connection to external conventional circuitry (not shown) in the reader.

The reading means 14 shown in FIGS. 2, 3, and 4 operates in the following manner. When a hole 48 is present in a data position in the lowermost card 50 (FIG. 3) of a deck of cards, a passage exists via the hole from the conduit 56 to the conduit 58, enabling air pressure from the source 54 to pass through the associated conduits 56 and 58 (as shown by the arrows 76). The air passing out of the conduit 58 is directed at the dish-shaped end 64, causing the arm 66 to bend (as shown in FIG. 3), bringing the end 64 into engagement with the contact 68 to complete a circuit to conventional external control circuitry (not shown). At a specific time, all of the switches 60 in the reading means 14 are read to enable the entire card to be read simultaneously. When no hole is present in a data location in the lowermost card 50 (as shown in FIG. 4), the passage of air from the source 54 through the conduits 56 and 58 is blocked by the card itself, and, consequently, no air comes out the conduit 58. As a result, the switch 60 associated with that particular data position remains open at the specific time when all the switches 60 are read. After being read, the lowermost card 50 (FIGS. 3 and 4) is removed by the transport means 16, and the next lowermost card 52 is positioned in reading relationship with the reading means 14 to repeat the reading process.

While the reading means 14 of FIGS. 3 and 4 is shown as operating from a source of pressure 54, it could also operate from a source of vacuum. When it operates from a source of vacuum, the direction of air flow would be opposite to the arrows 76 shown in FIG. 3, and the switch 60 would be conventionally altered to complete a circuit when a hole was present in the card being read. With no hole in a data location, the altered switch would remain open.

Figure 5:
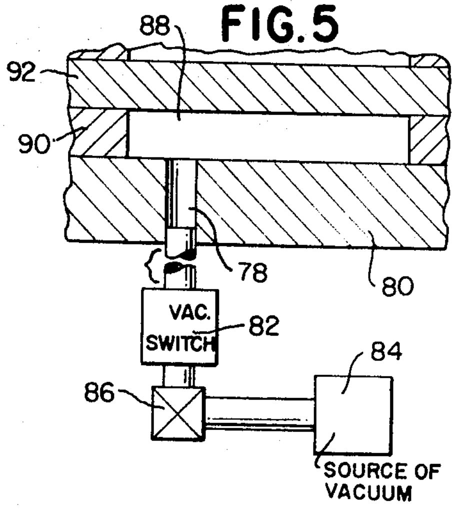
FIG. 5 is an enlarged cross-sectional view similar to FIG. 3 showing another embodiment of a reading station, which is vacuum-operated.

A slightly different reading means is shown in FIG. 5, which is a view similar to FIG. 3. In FIG. 5, a conduit 78 is provided for each data location in the card, with one end of the conduit passing through a plate 80 to communicate with the area where a hole in the card may be located. The other end of the conduit 78 is connected to a conventional vacuum-operated switch 82 like a Fairchild Faircon PSF100 ultra low pressure sensor or a Stolab Pitran Model PT2 pressure sensitive transistor. The switch 82 is also connected to a conventional source 84 of vacuum through a valve 86. When the valve 86 is opened rapidly, a vacuum is applied to each switch 82 associated with each data location in the card. Each switch 82 is adjusted so that a certain level of vacuum represents no hole in the card. Whenever the vacuum drops below that level immediately after valve 86 is opened, a hole in the card for that location is indicated. In FIG. 5, a hole 88 is present in the lowermost card 90, which is covered by the next-to-lowermost card 92. When the card 90 is to be read, the valve 86 is opened, and all the data positions are read. The lowermost card 90 is then removed from the bottom of the stack of cards by transport means (similar to the transport means 16 in FIG. 1), and the next card 92 is in position to be read.

In some instances, it may be necessary to utilize conventional fluid amplifiers such as the Corning 190415 Flip-Flop to actuate the reading means. Because the use of fluid amplifiers is conventional, they are not shown in the drawings. A non-perforated, plate-like weight 93 (FIG. 1) enables the topmost card in the stack 22 to be read when it is the last card to be read.

Figure 2:
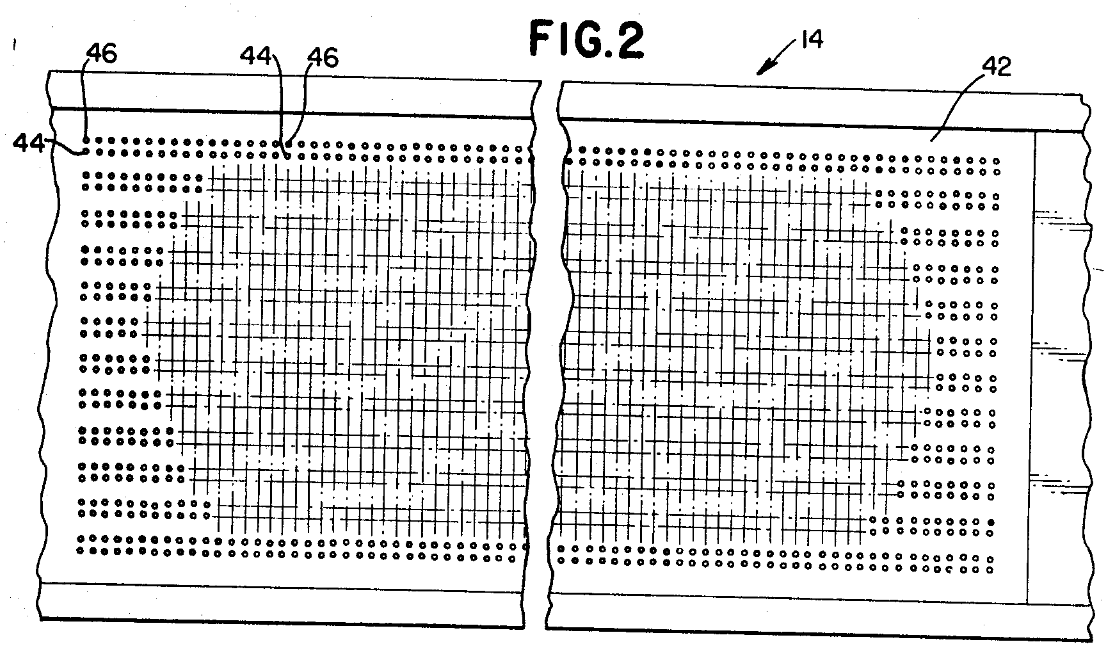
FIG. 2 is a plan view taken along the line 2—2 of FIG. 1 showing details of one embodiment of the reading station, which is air-operated.

While the cards are referred to as "lowermost" or "next-to-lowermost," it is apparent that these are relative terms and that the reading means 14 may be positioned vertically instead of being positioned horizontally as shown in FIG. 2. In such a circumstance, the stack of cards 22 would be fed towards the reading means 14 by conventional resilient means instead of using a gravity-type feed shown in FIG. 1.

What is claimed is:

1. An apparatus for reading data in the form of data holes in punched cards comprising:

an input hopper means having a feeding end and a discharge end for moving the cards in an axial direction therethrough;

a matrix-type reading head means positioned at said discharge end and axially aligned with said hopper means and in registration therewith, enabling said hopper means to position a card to be read in reading relationship with said reading head means to be read thereby;

said reading head means having individual reading means lying substantially in a plane which is parallel to the plane of the card to be read and arranged in an array corresponding to the various data positions for a punched card;

each said individual reading means being aligned to read a corresponding hole in said card to be read while said card is positioned at said discharge end of said hopper means; and card removal means for removing the card being read after reading, enabling the next card to be read to be positioned in reading relationship with said reading head means by only said hopper means;

each said individual reading means having its own switch means; and pneumatic means for each said switch means to close the associated switch means only when a data hole is present in the associated data position of the card being read;

said pneumatic means comprising:

a source of air pressure;

a plate located at the discharge end of said hopper means, said plate having first and second holes therein for each data position in a card to be read;

a first conduit for each data position connecting said source with the first hole at the associated data position; and a second conduit for each data position connecting the associated switch means with the associated second hole;

each said switch means being adapted to be closed when the associated data position has a hole present thereat.

* * * * *